Nov. 23, 1937.     B. R. DUTCHER     2,099,845
APPARATUS FOR MOUNTING PRINTS AND THE LIKE
Filed Sept. 18, 1935
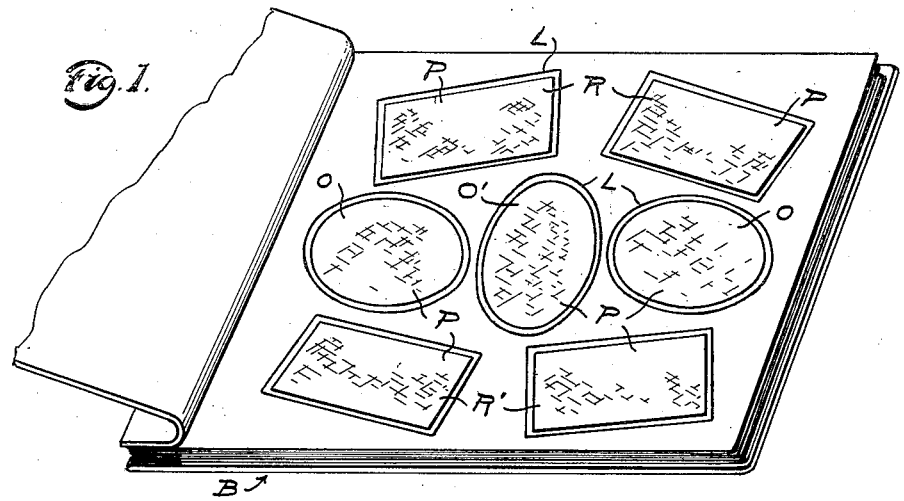
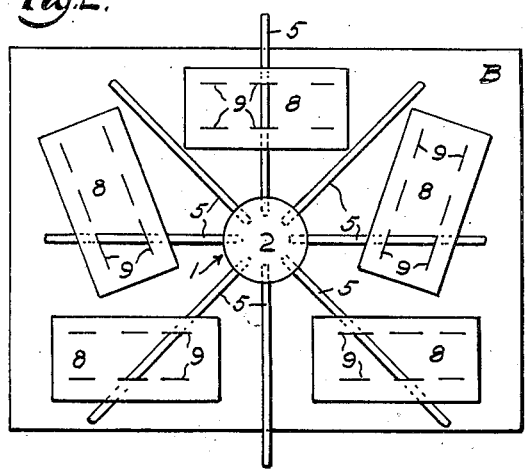
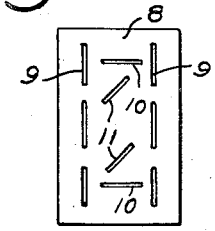
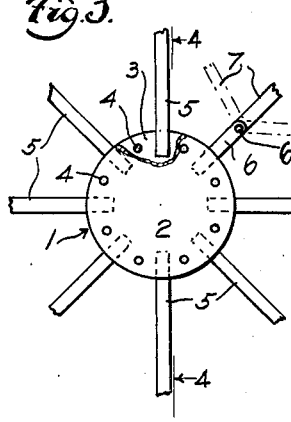
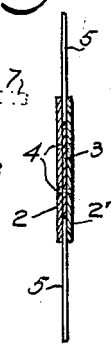
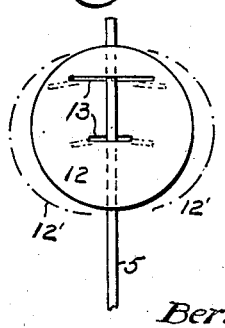
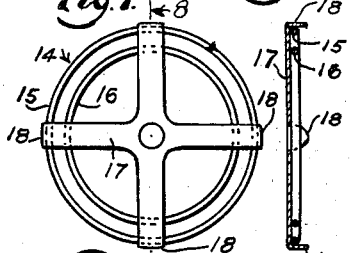
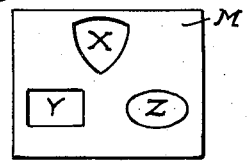
INVENTOR:
Bernard R. Dutcher,
BY
Harold D. Penney,
ATTORNEY.

Patented Nov. 23, 1937

2,099,845

UNITED STATES PATENT OFFICE 2,099,845

APPARATUS FOR MOUNTING PRINTS AND THE LIKE

Bernard R. Dutcher, Bogota, N. J.

Application September 18, 1935, Serial No. 41,040

11 Claims. (Cl. 33—174)

The present invention relates to apparatus for mounting plural photographic or other prints and pictures in albums or on cards, and has for its principal object the provision of means to aid amateur photographers and artists in arranging such pictures and prints, in artistic and attractive group arrangements, and, further, to aid in the embellishment of such prints after mounting, by providing supplemental guides for bordering said prints with plain, or ornamental borders.

To this end, as will appear more in detail, later, means are provided, including plural stencils and templets of suitable design, which stencils and templets have coordinating contours, and a templet coordinating spider, upon which selected plural templets may be temporarily mounted and coordinated with each other in pleasing and artistic symmetrical, or assymmetrical arrangement, after which the spider and its mounted templets may be placed on a card or album sheet and the templets outlined in pencil thereon, thus to initially delineate upon said sheet the proposed or desired location arrangement of the pictures or prints, as they will subsequently be mounted, this being one of the features of advantage.

The foregoing, and other features will be apprehended as the herein description proceeds, and it will be obvious that modifications may be made in the structure and method herein, without departing from the spirit hereof, or the scope of the appended claims.

In the drawing,

Fig. 1 is a fragmented, perspective view of an open album, by way of illustration, showing one form of a group of mounted and embellished prints thereon;

Fig. 2 is a plan view of one form of spider, laid upon a card mounting with a plurality of templets mounted upon said spider in a form of geometric coordination;

Fig. 3 is an enlarged plan view of the spider, with the arms broken away, showing details of structure;

Fig. 4 is a sectional view taken on the line 4—4, Fig. 3, looking in the direction of the arrows;

Fig. 5 is a plan view of a characteristic templet of one form of contour;

Fig. 6 is a plan view of another templet of different contour mounted upon one of the spider arms;

Fig. 7 is a plan view of one of the forms of border embellishing stencil;

Fig. 8 is a sectional view thereof, taken on line 8—8, Fig. 7, looking in the direction of the arrows; and Fig. 9 is a plan view of a mask having stencil cut-outs therein of varying contours.

The print positioning coordinator is shown in Fig. 2, as comprising a central spider-arm holding disc 2, having a plurality of radiating arms 5 extending therefrom, in symmetrical, spaced arrangement.

Upon certain of the arms 5 are mounted templets 8. These templets 8 are each provided with a plurality of slits 9, which slits may be slightly elongate, so as to be somewhat wider than the dimension of the arm 5, and which slits, further, may be otherwise arranged within the area of the templets, such as, for instance, is shown in Fig. 5, at 9, 10 and 11, or in Fig. 6, as at 13.

The purpose of the slits, as indicated in Figs. 2 and 6, is to permit them to receive the arms 5 therein and thus adjustably and operably mount the templets in desired pleasing group arrangement upon the spider. As will be seen in Fig. 2, three of the templets 8 are located in parallel relation, while two of them are arranged in symmetrical angles to each other and to the other parallel templets. This juxtaposition of templets is accomplished by using any selected two of the slits in the opposing rows thereof, in mounting a templet upon an arm. This arrangement of slits facilitates the utilization of numerous varying group arrangements or patterns.

After the templets are arranged in the desired geometric grouping, the assembly is placed upon a card or plane B, Fig. 2, and the outlines of the templets traced by pencil upon said card, thus to indicate, thereafter, the permanent positions of the prints to be mounted thereon.

The templets may be of various shapes and slitting, a variation of slitting and consequent variation of templet position being shown in Fig. 5, the intermediate slits 10 and 11, in addition to slits 9, permitting of variable geometric positioning over that shown in Fig. 2.

Where templets are of circular contour, as at 12, Fig. 6, the only variation required is that of varying the center of the circular template 12 to either of the offset positions 12'—12', relative to the arms 5, and to this end, the parallel slits 13—13 are of varied, elongate length, relative to each other, to permit of angular side shift of the templet, as described above.

The elongate slits 9, 10 and 11 of the templets 8, Figs. 2 and 5 also permit of angular side shift, when desired, as described for Fig. 6.

The spider is preferably so constructed as to permit it to be taken apart, for convenient storing in a suitable container, and as shown in Figs. 3 and 4, in one form of embodiment, it may be made up of three discs 2—2' and 3, riveted together by rivets, or eyelets 4. The outer and inner discs 2—2' and 3, are of like diameter and thickness. The inner disc 3 is provided at its perimeter with a series of dentate slots which, with outer discs 2 and 2', form pockets, into which is inserted one end of the arms 5, as illustrated at 3, Fig. 3, at the broken away portion. Thus, the arms 5 may be inserted and removed at will, and when in operative position, they are firmly held.

A modified form of movable templet arm is shown in Fig. 3, at 6, 6' and 7—7. In this structure the arm 7 is pivotally and frictionally attached at 6', to an arm support 6. This construction permits of the arm 7 being moved to either side of the normal, radial position of the arm, as indicated by the dotted positions, in said figure. This arrangement permits of further variations of the print locating pattern, and some, or all of the arms 5, may be so pivotally constructed.

After a print location pattern has been selected, such as those shown in either Figs. 1 or 2, a stencil mask M, Fig. 9, shown greatly reduced, having one, or a plurality of stencil cut-outs, X, Y and Z, of different outline, are used to pencil an outline on the prints, to be mounted, to the outline and size of the templets used. It is understood that the mask or masks are provided with stencils the same size and outline as the templets used in the print location pattern.

Then the prints are cut to the stencilled outlines, and mounted upon the sheet B, in the pencilled print locations, as in Fig. 1.

The mounted prints may then each be enhanced in appearance, by placing a border line, such as L, Fig. 1, in any desired, preferably evenly spaced relation to the prints P, R, L, O and O' and the placing of the border will now be described.

In Figs. 7 and 8 there is shown a border stencil 14, in the present instance, comprising two outer spaced circular rings 15—16 which are held in spaced relation by the prong ends 18 of a four armed center piece 17. The ends 18 are bent to extend below the opposite under face of the rings 15—16 and are slightly pointed, so as to firmly engage the surface of the sheet B, when in use.

The diameter of the circle of the space between the ring portions 15—16 of the stencil 14 is such that when a marking stylus is placed therein to scribe a border line L around a circular print, the line L will be spaced a predetermined even distance away from the mounted print.

Border stencils of proper outline to suit prints outlined by templates 8 and 12, as well as those shown in Fig. 1, are furnished, made up as described for Fig. 7, differing therefrom only in outline. The downstanding prong ends 18, Fig. 8 serve a further purpose of keeping the stencil portions away from the paper and wet border line where the border line is freshly drawn in, in either ink or liquid colors.

The various parts of the device herein may be constructed of suitable materials, such as sheet metal, sheet celluloid and other thin materials.

As above described it is obvious that the various templets, in their dimensions and outlines must each have coordinating cut-out and border line stencils, so that the combined results, as in Fig. 1, form a pleasing effect.

It is also obvious that a wide latitude of artistry is afforded the user, who is free to exercise his or her skill and preference in the mounting of pictures, prints and even postage stamps, as fancy dictates, using some, or all of the arms 5, as desired, for templet arrangement.

What I claim is:

1. An apparatus for assisting in mounting separate plural prints upon a sheet, said apparatus comprising means providing a relatively stiff bodily movable contour outline of each of the plural prints distinct from the prints; and means for mechanically bodily adjusting each stiff outline as a whole in distance apart relative to each other outline and adjusting each outline angularly independently of said adjustment in distance and securing them in temporarily fixed relation with the major portion of each outline remote from exterior structure for coordinating said outlines in the desired relative coordinated positions of the prints one to another and maintaining said stiff outlines in said relative positions.

2. A print coordinator comprising members; templets; means for adjustably securing the members together; and means for angularly adjustably securing the templets on the members.

3. A print coordinator comprising templets; means for adjustably securing the templets different distances apart and angularly adjustably securing the templets in various different angles when at the same distance apart.

4. A print coordinator comprising arms; templets; means for securing the arms together; and means for angularly and longitudinally adjustably securing the templets relatively to the arms on the arms.

5. A print coordinator comprising a support; arms projecting from and secured to the support; templets; and means for securing each templet on a single arm and having locating parts projecting from the arm.

6. A print coordinator comprising arms; templets; means for securing the arms together with the major portion of each arm remote from the adjacent arm; and means for securing the templets on the arms with edges projecting beyond the arms.

7. An apparatus for assisting in mounting a plurality of associate picture prints upon a sheet mounting, said apparatus comprising a plurality of arms; means for connecting said arms relatively angular to the point of their connection, the major portion of each arm being remotely angularly spaced from any part of the adjacent arm; and a plurality of templets respectively mounted on associated arms and projecting beyond the side edges of the arm.

8. An apparatus for assisting in mounting a plurality of associate picture prints upon a sheet mounting, said apparatus comprising a plurality of arms; means for connecting said arms relatively substantially radial to the point of their connection, the major portion of each arm being remotely angularly spaced from any part of the adjacent arm; and a plurality of templets; each templet being adjustably mounted on a single associated arm, and being longer than such arm is wide to provide guide-edges beyond the arm.

9. An apparatus for assisting in mounting a plurality of associate picture prints upon a sheet mounting, said apparatus comprising a plurality of arms; means for pivotally connecting said arms relatively angularly adjustably substantially or approximately radial to the point of their pivotal connection, the major portion of each arm being remotely angularly spaced from any part of the adjacent arm; and a plurality of templets; each templet being angularly adjustably mounted on a single associated arm, and being longer than such arm is wide to provide guide-edges beyond the arm.

10. An apparatus for assisting in mounting a plurality of associate picture prints upon a sheet mounting, said apparatus comprising a plurality of arms; means for pivotally connecting said arms relatively angularly adjustably substantially or approximately radial to the point of their pivotal connection, the major portion of each arm being remotely angularly spaced from any part of the adjacent arm; and a plurality of templets simulating the contour outline of respective picture prints to be mounted; each templet being longitudinally and angularly adjustably mounted on a single associated arm, and being much longer and wider than such arm is wide to provide outer perimeter guide-edges beyond the arm.

11. A print coordinator comprising members; print locating devices; means for adjustably securing the members together; and means for angularly adjustably securing the devices on the members.

BERNARD R. DUTCHER.